(12) United States Patent
Haga et al.

(10) Patent No.: US 12,529,733 B2
(45) Date of Patent: Jan. 20, 2026

(54) DETERMINATION DEVICE, DETERMINATION METHOD, AND DETERMINATION PROGRAM

(71) Applicant: TOYOTA JIDOSHA KABUSHIKI KAISHA, Toyota (JP)

(72) Inventors: Nobuyasu Haga, Seto (JP); Yumi Kondo, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 422 days.

(21) Appl. No.: 18/318,178

(22) Filed: May 16, 2023

(65) Prior Publication Data

US 2024/0027538 A1 Jan. 25, 2024

(30) Foreign Application Priority Data

Jul. 21, 2022 (JP) ................. 2022-116657

(51) Int. Cl.
*G01R 31/392* (2019.01)
*G01R 31/367* (2019.01)
*G01R 31/3835* (2019.01)

(52) U.S. Cl.
CPC ......... *G01R 31/392* (2019.01); *G01R 31/367* (2019.01); *G01R 31/3835* (2019.01); *B60L 2240/547* (2013.01)

(58) Field of Classification Search
CPC G01R 31/392; G01R 31/367; G01R 31/3835; G01R 31/007; G01R 31/385; G01R 31/387; G01R 31/388; B60L 2240/547; B60L 58/12; B60L 58/16; H01M 10/486; H01M 10/48; H01M 2220/20; B60R 16/0232; B60R 16/02
See application file for complete search history.

(56) References Cited

FOREIGN PATENT DOCUMENTS

| CN | 110061531 A | * | 7/2019 | ............ H02J 7/0014 |
|---|---|---|---|---|
| JP | 2003-214248 A | | 7/2003 | |
| JP | 2004-135453 A | | 4/2004 | |
| JP | 2004-190604 A | | 7/2004 | |
| JP | 2015-162991 A | | 9/2015 | |
| WO | WO 2010143278 A1 | * | 12/2010 | ............. B60L 50/15 |
| WO | WO 2015/128709 A1 | | 9/2015 | |

* cited by examiner

*Primary Examiner* — Tung S Lau
(74) *Attorney, Agent, or Firm* — Oblon, McClelland, Maier & Neustadt, L.L.P.

(57) ABSTRACT

A determination device includes an acquisition unit configured to acquire information on a state of a battery mounted on a vehicle, the information including information on a voltage value of the battery, and a determination unit configured to determine that the battery is deteriorated based on the information acquired by the acquisition unit, in a case where a frequency of prohibition of control of the vehicle using the battery exceeds a predetermined first threshold value and a voltage of the battery falls below a predetermined second threshold value.

4 Claims, 6 Drawing Sheets

DETERMINATION DEVICE, DETERMINATION METHOD, AND DETERMINATION PROGRAM

CROSS-REFERENCE TO RELATED APPLICATION

This application claims priority to Japanese Patent Application No. 2022-116657 filed on Jul. 21, 2022 incorporated herein by reference in its entirety.

BACKGROUND

1. Technical Field

The present disclosure relates to a determination device, a determination method, and a determination program.

2. Description of Related Art

In a case where a battery mounted on a vehicle is deteriorated, a start-up failure or an engine stall of the vehicle is generated. Therefore, Japanese Unexamined Patent Application Publication No. 2003-214248 (JP 2003-214248 A) discloses a technique for determining whether or not a battery mounted on a vehicle is deteriorated, in which a technique for calculating a voltage change in a battery voltage to determine the deterioration in the battery based on the voltage change in the battery voltage and a predetermined determination value is disclosed.

SUMMARY

However, the battery voltage is also generated by, for example, a decrease in a state of charge (SOC) or a decrease in a temperature, in addition to the deterioration in the battery. Therefore, the deterioration in the battery cannot be correctly determined by a rule-based determination simply using the battery voltage. On the other hand, in a case where a physical model or artificial intelligence (AI) is used to improve accuracy of determination, a load of advance preparation, such as a decision of a parameter, is generated.

The present disclosure has been made in view of the above points, and is to provide a determination device, a determination method, and a determination program that improve the accuracy of determination of the deterioration in the battery as compared with the rule-based determination without generating the load of the advance preparation.

A first aspect of the present disclosure relates to a determination device including an acquisition unit and a determination unit. The acquisition unit is configured to acquire information on a state of a battery mounted on a vehicle, the information including information on a voltage value of the battery. The determination unit is configured to determine that the battery is deteriorated based on the information acquired by the acquisition unit, in a case where a frequency with which control of the vehicle using the battery is prohibited exceeds a predetermined first threshold value and a voltage of the battery falls below a predetermined second threshold value.

According to the first aspect of the present disclosure, since the frequency with which the control of the vehicle is prohibited and the information on the voltage value are used, the accuracy of determination of the deterioration in the battery can be improved as compared with the rule-based determination without generating the load of the advance preparation.

A second aspect of the present disclosure relates to the determination device according to the first aspect, in which the determination unit may be configured to determine whether or not the frequency with which the control of the vehicle using the battery is prohibited exceeds the first threshold value, based on whether or not a frequency with which the voltage of the battery falls below a first voltage exceeds the first threshold value.

According to the second aspect of the present disclosure, the determination can be made using the frequency with which the control of the vehicle is prohibited using the frequency with which the voltage of the battery falls below the first voltage.

A third aspect of the present disclosure relates to the determination device according to the second aspect, in which the determination unit may be configured to determine whether or not the voltage of the battery falls below the second threshold value, based on whether or not the voltage of the battery falls below a second voltage lower than the first voltage.

According to the third aspect of the present disclosure, whether or not the battery is deteriorated can be determined based on whether or not the voltage of the battery falls below the second voltage lower than the first voltage.

A fourth aspect of the present disclosure relates to the determination device according to the first aspect, in which the determination unit may be configured to determine whether or not the frequency with which the control of the vehicle using the battery is prohibited exceeds the first threshold value, based on whether or not a frequency with which a flag of prohibition of the control of the vehicle using the battery is set up exceeds the first threshold value.

According to the fourth aspect of the present disclosure, the determination can be made using the frequency with which the control of the vehicle is prohibited using the frequency with which the flag of the prohibition of the control of the vehicle using the battery is set up.

A fifth aspect of the present disclosure relates to the determination device according to any one of the first to fourth aspects, in which the determination unit may be configured to make a determination solely in a case where a temperature of the battery is within a range of a predetermined reference value.

According to the fifth aspect of the present disclosure, an erroneous determination due to a change in the voltage of the battery due to a fluctuation in the temperature can be avoided.

A sixth aspect of the present disclosure relates to the determination device according to the fifth aspect, in which the determination unit may be configured to make a determination by making a correction to a voltage within the range of the reference value in a case where the temperature of the battery is not within the range of the reference value.

According to the sixth aspect of the present disclosure, the determination can be made in consideration of the change in the voltage of the battery due to the fluctuation in the temperature.

A seventh aspect of the present disclosure relates to the determination device according to any one of the first to fourth aspects, in which the determination unit may be configured to make a determination using the information in a case where the battery has not been used for a time equal to or longer than a predetermined time.

According to the seventh aspect of the present disclosure, the determination can be made in consideration of the change in the voltage of the battery due to a fluctuation in a concentration gradient inside the battery.

An eighth aspect of the present disclosure relates to the determination device according to any one of the first to fourth aspects, that may further include an output unit configured to, in a case where the determination unit determines that the battery is deteriorated, output a result of the determination to an outside.

According to the eighth aspect of the present disclosure, a notification whether or not the battery of the vehicle is deteriorated can be given.

A ninth aspect of the present disclosure relates to a determination method executed by a processor. The determination method includes acquiring information on a state of a battery mounted on a vehicle, the information including information on a voltage value of the battery, and determining that the battery is deteriorated based on the acquired information, in a case where a frequency with which control of the vehicle using the battery is prohibited exceeds a predetermined first threshold value and a voltage of the battery falls below a predetermined second threshold value.

According to the ninth aspect of the present disclosure, since the frequency with which the control of the vehicle is prohibited and the information on the voltage value are used, the accuracy of determination of the deterioration in the battery can be improved as compared with the rule-based determination without generating the load of the advance preparation.

A tenth aspect of the present disclosure relates to a determination program causing a computer to execute a process. The process includes acquiring information on a state of a battery mounted on a vehicle, the information including information on a voltage value of the battery, and determining that the battery is deteriorated based on the acquired information, in a case where a frequency with which control of the vehicle using the battery is prohibited exceeds a predetermined first threshold value and a voltage of the battery falls below a predetermined second threshold value.

According to the tenth aspect of the present disclosure, since the frequency with which the control of the vehicle is prohibited and the information on the voltage value are used, the accuracy of determination of the deterioration in the battery can be improved as compared with the rule-based determination without generating the load of the advance preparation.

According to the present disclosure, the determination device, the determination method, and the determination program that improve the accuracy of determination of the deterioration in the battery as compared with the rule-based determination without generating the load of the advance preparation can be provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
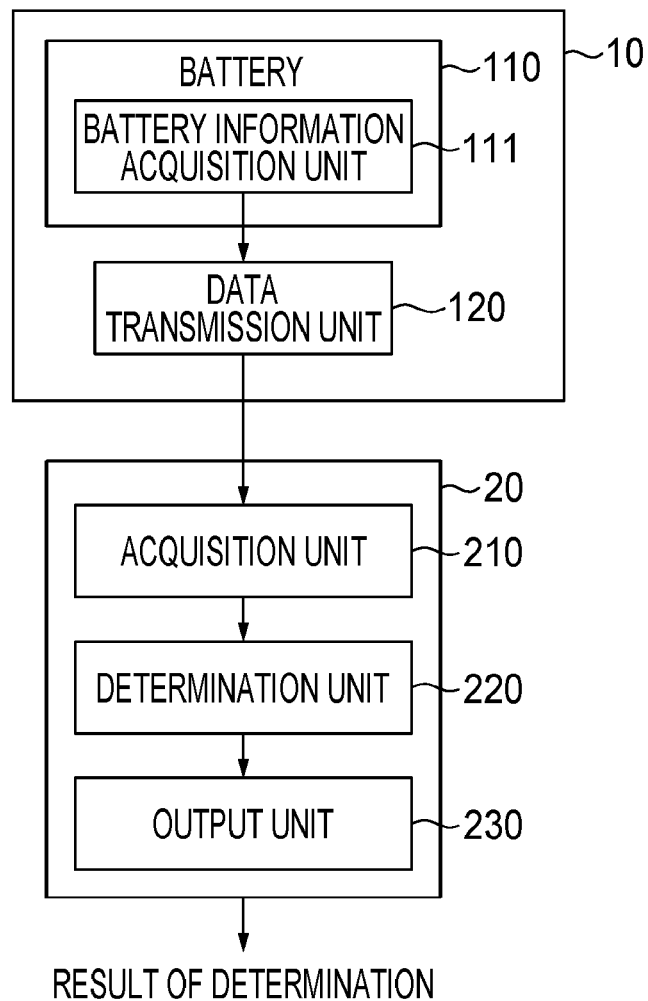
FIG. 1 is a diagram showing a schematic configuration of a determination system according to an embodiment of the disclosed technique.

Hereinafter, an example of an embodiment of the present disclosure will be described with reference to the drawings. Note that, in each drawing, the same or equivalent components and portions are given the same reference numerals. Also, the dimensional ratios in the drawings are exaggerated for convenience of description, and may differ from the actual ratios.

FIG. 1 is a diagram showing a schematic configuration of a determination system according to the present embodiment.

The determination system shown in FIG. 1 includes a vehicle 10 and a determination device 20. The vehicle 10 and the determination device 20 are communicably connected via a predetermined wireless network.

The vehicle 10 includes a battery 110 and a data transmission unit 120. Here, configurations unneeded for the present embodiment are omitted. In the present embodiment, the battery 110 of the vehicle 10 is an auxiliary battery for operating the vehicle 10.

The determination device 20 is a device that determines whether or not the battery 110 of the vehicle 10 is deteriorated, and can be configured as a server, for example.

Figure 2:
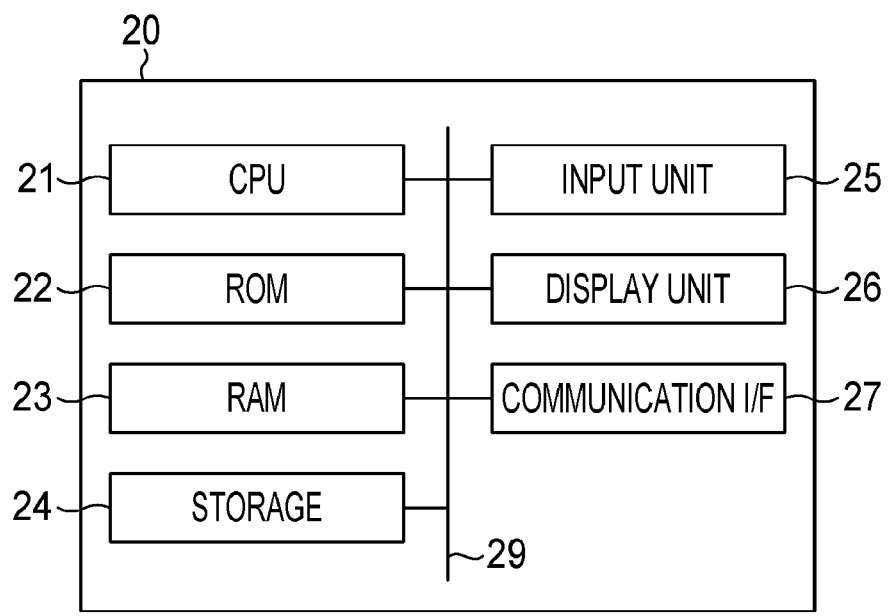
FIG. 2 is a block diagram showing a hardware configuration of a determination device.

FIG. 2 is a block diagram showing a hardware configuration of the determination device 20.

As shown in FIG. 2, the determination device 20 includes a central processing unit (CPU) 21, a read only memory (ROM) 22, a random access memory (RAM) 23, a storage 24, an input unit 25, a display unit 26, and a communication interface (I/F) 27. The configurations are communicatively connected to each other via a bus 29.

The CPU 21 is a central processing unit, and executes various programs or controls each unit. That is, the CPU 21 reads out a program from the ROM 22 or the storage 24 and executes the program by using the RAM 23 as a work area. The CPU 21 controls each configuration described above and executes various arithmetic processing according to the program recorded in the ROM 22 or the storage 24. In the present embodiment, the ROM 22 or the storage 24 stores a determination program for determining the deterioration in the battery 110 of the vehicle 10.

The ROM 22 stores various programs and various data. The RAM 23 serves as the work area and transitorily stores the program or the data. The storage 24 is configured by a storage device (storage medium), such as a hard disk drive (HDD), a solid state drive (SSD), or a flash memory, and stores various programs including an operating system, and various data.

The input unit 25 includes a pointing device, such as a mouse, and a keyboard, and is used for various inputs.

The display unit 26 is, for example, a liquid crystal display, and displays various information. The display unit 26 may adopt a touch panel system and function as the input unit 25.

The communication interface 27 is an interface for communicating with other devices, such as the vehicle 10, and uses standards, such as Ethernet (registered trademark), FDDI, and Wi-Fi (registered trademark).

In a case where the determination program described above is executed, the determination device 20 uses the hardware resources described above to realize various functions. Returning to FIG. 1, a functional configuration realized by the determination device 20 will be described.

As shown in FIG. 1, the determination device 20 includes an acquisition unit 210, a determination unit 220, and an output unit 230, as the functional configurations. Note that each functional configuration is realized by the CPU 21 reading out and executing the determination program stored in the ROM 22 or the storage 24.

The acquisition unit 210 acquires information on a state of the battery 110 including information on a voltage value of the battery 110 mounted on the vehicle 10. The information on the state of the battery 110 is acquired by a battery information acquisition unit 111 provided in the battery 110. The information on the state of the battery 110 can include information on a temperature of the battery 110 in addition to the voltage value of the battery 110. The information on the state of the battery 110 is transmitted to the determination device 20 by the data transmission unit 120. The data transmission unit 120 transmits the information on the state of the battery 110 to the determination device 20 at a predetermined timing, such as when the vehicle 10 starts to trip (timing when the vehicle 10 is started up) or when the vehicle 10 is stopped.

The determination unit 220 determines whether or not the battery 110 is deteriorated using the information on the state of the battery 110 acquired by the acquisition unit 210. The determination of the deterioration in the battery 110 by the determination unit 220 will be described.

Figure 3:
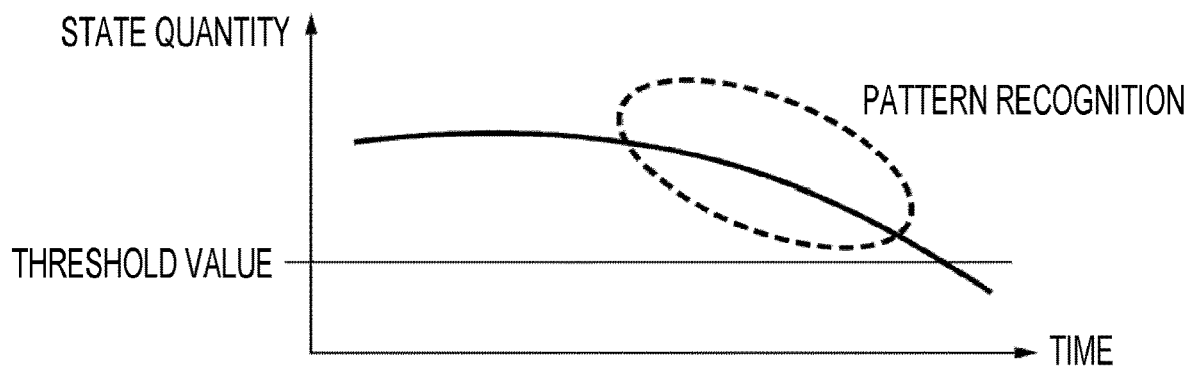
FIG. 3 is a diagram showing an example of a relationship between a time when a battery is deteriorated and a state quantity of the battery.
Figure 4:
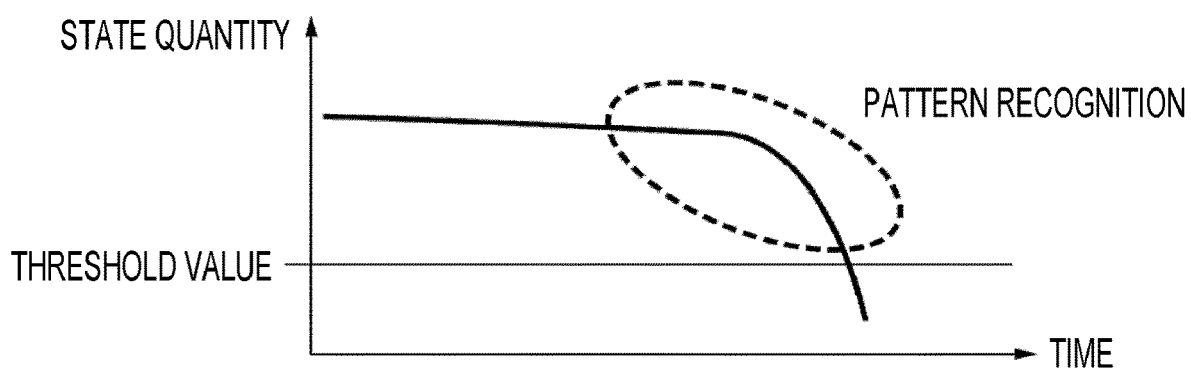
FIG. 4 is a diagram showing an example of a relationship between a time when an SOC of the battery is decreased and the state quantity of the battery.
Figure 5:
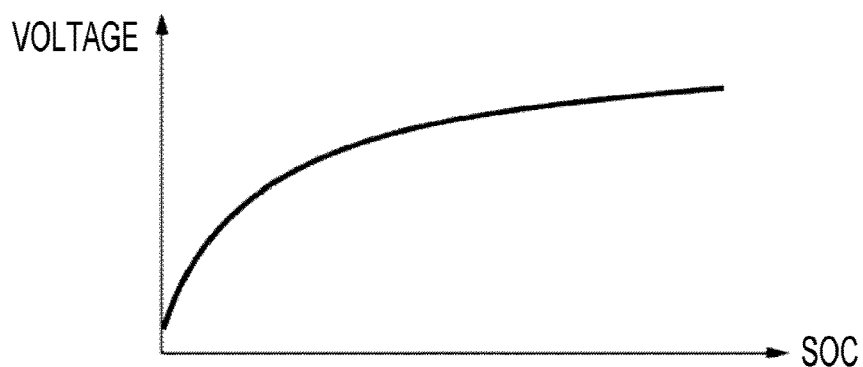
FIG. 5 is a diagram showing an example of a relationship between the SOC of the battery and a voltage.

As a method of determining the deterioration in the battery 110, there is a method of making a determination based on the battery voltage. However, the battery voltage is decreased due to a decrease in an SOC in addition to the deterioration in the battery. FIG. 3 is a diagram showing an example of a relationship between a time when the battery is deteriorated and a state quantity (for example, the voltage) of the battery, and FIG. 4 is a diagram showing an example of a relationship between a time when the SOC of the battery is decreased and the state quantity (for example, the voltage) of the battery. FIG. 5 is a diagram showing an example of a relationship between the SOC of the battery and the voltage.

In a case where simple rule-based logic is used to determine that the battery is deteriorated due to the voltage that falls below a predetermined threshold value, there is a possibility that the determination is made that the battery is deteriorated due to the decrease in the SOC of the battery even in a case where the battery is not actually deteriorated.

As shown in FIGS. 3 and 4, a degree of the decrease in the state quantity of the battery over time differs between a case where the battery is deteriorated and a case where the SOC of the battery is decreased. Therefore, in a case where a physical model or artificial intelligence (AI) is used to discriminate between the deterioration in the battery and the decrease in the SOC of the battery, the deterioration in the battery is more easily detected, but a load of advance preparation, such as a decision of a parameter, is generated.

That is, in a case where the simple rule-based logic is used, the load of the determination is lower than the load in a case where the physical model or the artificial intelligence is used, but the accuracy of determination is inferior to the accuracy of determination in a case where the physical model or the artificial intelligence is used.

In a case where the SOC of the battery 110 is decreased, the deterioration is accelerated or a start-up failure of the vehicle 10 due to the decrease in the voltage is caused. Therefore, the SOC of the battery 110 while the vehicle 10 is traveling is controlled to maintain a high state. On the one hand, there is control of the vehicle 10 that consumes the energy of the battery 110. The control of the vehicle 10 that consumes the energy of the battery 110 is also simply referred to as vehicle control in the following description. For example, in a case of the S&S control, the battery 110 is not charged because the engine is stopped and an alternator is stopped when the vehicle 10 is stopped, for example, for waiting for the traffic lights to change, and the engine is restarted up when the vehicle 10 starts moving, and thus the energy of the battery 110 is consumed when the vehicle 10 starts moving. Therefore, in a case of the S&S control, the vehicle 10 monitors a voltage level of the battery 110 to determine whether or not to execute the S&S control in order to maintain the SOC of the battery 110 at a high state. In a case where the S&S control is not executed, the battery 110 is charged because the alternator is operated even when the vehicle 10 is stopped. As shown in FIG. 5, there is generally a correlation between the voltage of the battery and the SOC.

Figure 6:
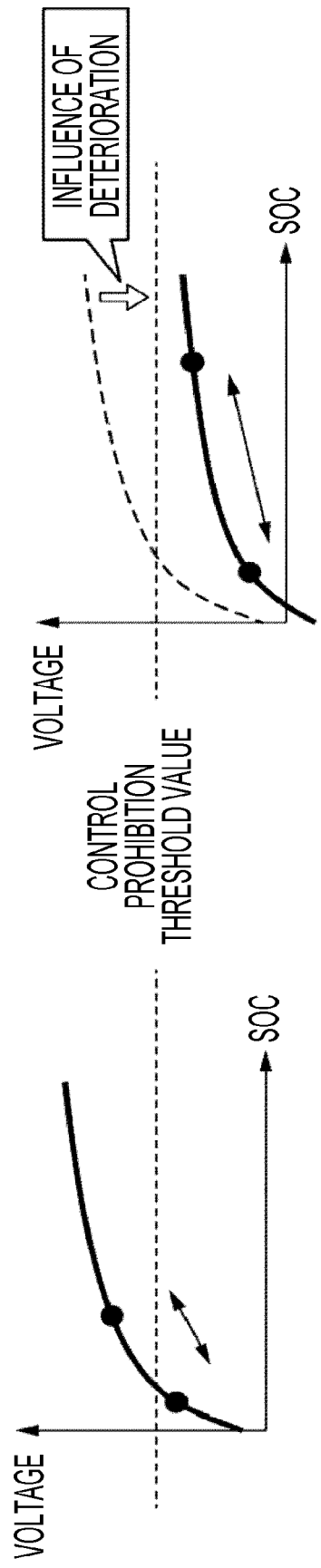
FIG. 6 is a diagram for describing a comparison between a case where a battery is in an initial-stage state and a case where a battery is in a deterioration advanced state.

FIG. 6 is a diagram for describing a comparison between a case where the battery 110 is in an initial-stage state and a case where the battery 110 is in a deterioration advanced state.

In a case where the battery 110 is in the initial-stage state, even in a case where the SOC and the voltage of the battery 110 are decreased due to the S&S control of the vehicle 10, the S&S control is prohibited when the voltage is equal to or lower than a certain threshold value, and thus the battery 110 is eventually charged and the SOC and the voltage of the battery 110 are recovered.

On the other hand, in a case of the deterioration advanced state (deterioration terminal-stage state) of the battery 110, the voltage is not recovered even when the battery 110 is charged. In other words, in a case where the battery 110 is in the deterioration terminal-stage state, the voltage cannot exceed the threshold value regardless of the state of the SOC, and the S&S control is always prohibited. Therefore, the state of the deterioration in the battery 110 can be detected from the voltage level or a frequency of the S&S control of the vehicle.

Figure 7:
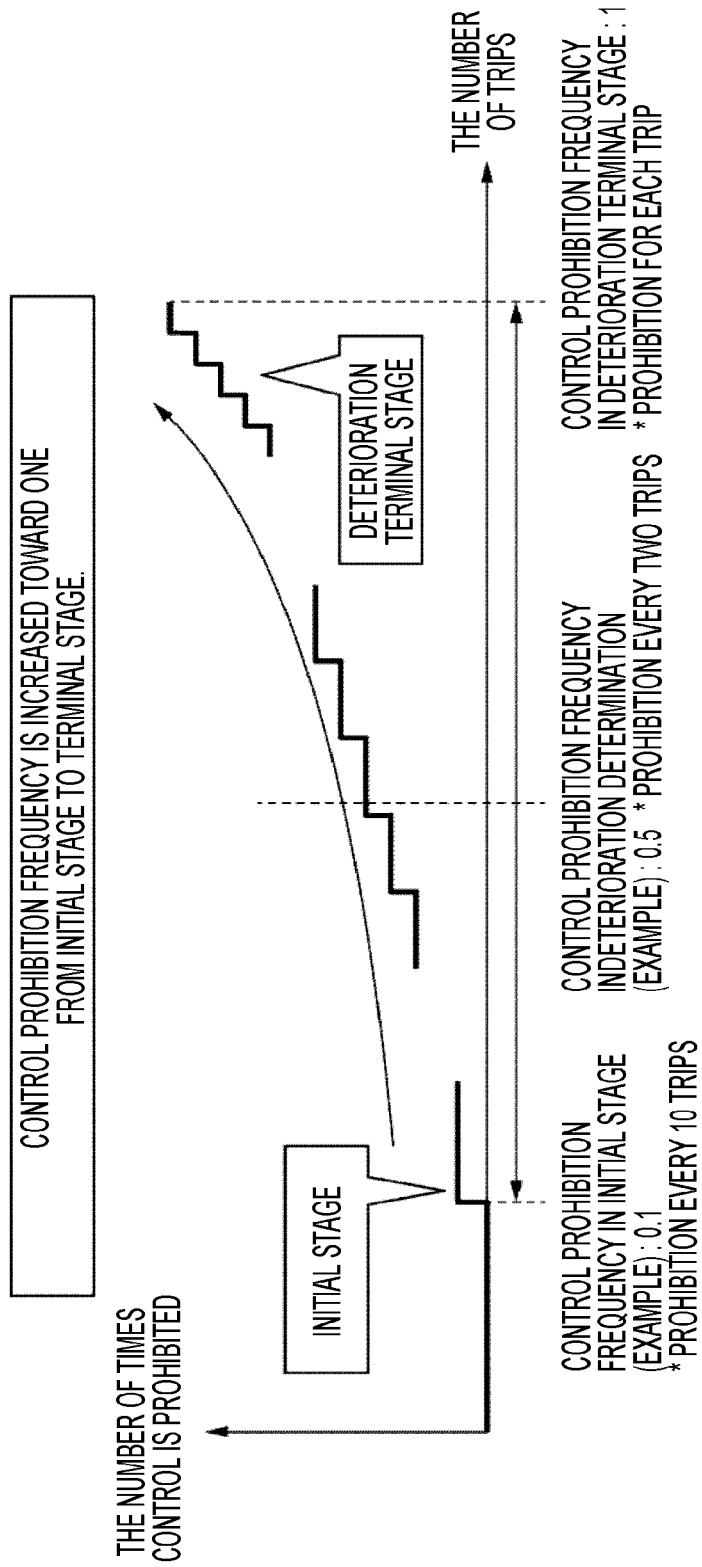
FIG. 7 is a diagram showing an example of a relationship between the number of trips of a vehicle and the number of times start and stop (S&S) control is prohibited.

FIG. 7 is a diagram showing an example of a relationship between the number of trips of the vehicle 10 and the number of times the S&S control is prohibited. In a case where the battery 110 is in the initial-stage state, a frequency with which the S&S control is prohibited is low, for example, once every 10 trips. Thereafter, as the deterioration in the battery 110 progresses gradually, the frequency with which the S&S control is prohibited is increased, and the S&S control is prohibited for each trip in the deterioration terminal-stage state of the battery 110. That is, the control prohibition frequency is increased toward one as the deterioration in the battery 110 progresses.

The determination unit 220 determines whether or not the battery 110 is deteriorated by using the characteristic that the control prohibition frequency is increased toward one as the deterioration in the battery 110 progresses. Specifically, a voltage recovery threshold value at which the voltage of the battery 110 is assumed to be recovered due to the stop of the vehicle control, and a deterioration determination threshold value for determining the deterioration in the battery 110 are set. Note that the voltage recovery threshold value is equal to or higher than the deterioration determination threshold value.

The determination unit 220 calculates a frequency (control prohibition frequency) with which the voltage of the battery 110 is lower than the voltage recovery threshold value. In the deterioration terminal-stage state of the battery 110, the control prohibition frequency approaches one, and thus the determination unit 220 turns on a voltage recovery impossible flag (sets up the flag) at a timing when the control prohibition frequency exceeds a predetermined first threshold value (for example, 0.5).

In addition, the determination unit 220 turns on a voltage decrease flag in a case where the voltage of the battery 110 is lower than the deterioration determination threshold value. The deterioration determination threshold value is an example of a second threshold value of the present disclosure.

The determination unit 220 determines that the battery 110 is deteriorated in a case where both the voltage recovery impossible flag and the voltage decrease flag are turned on.

Figure 8:
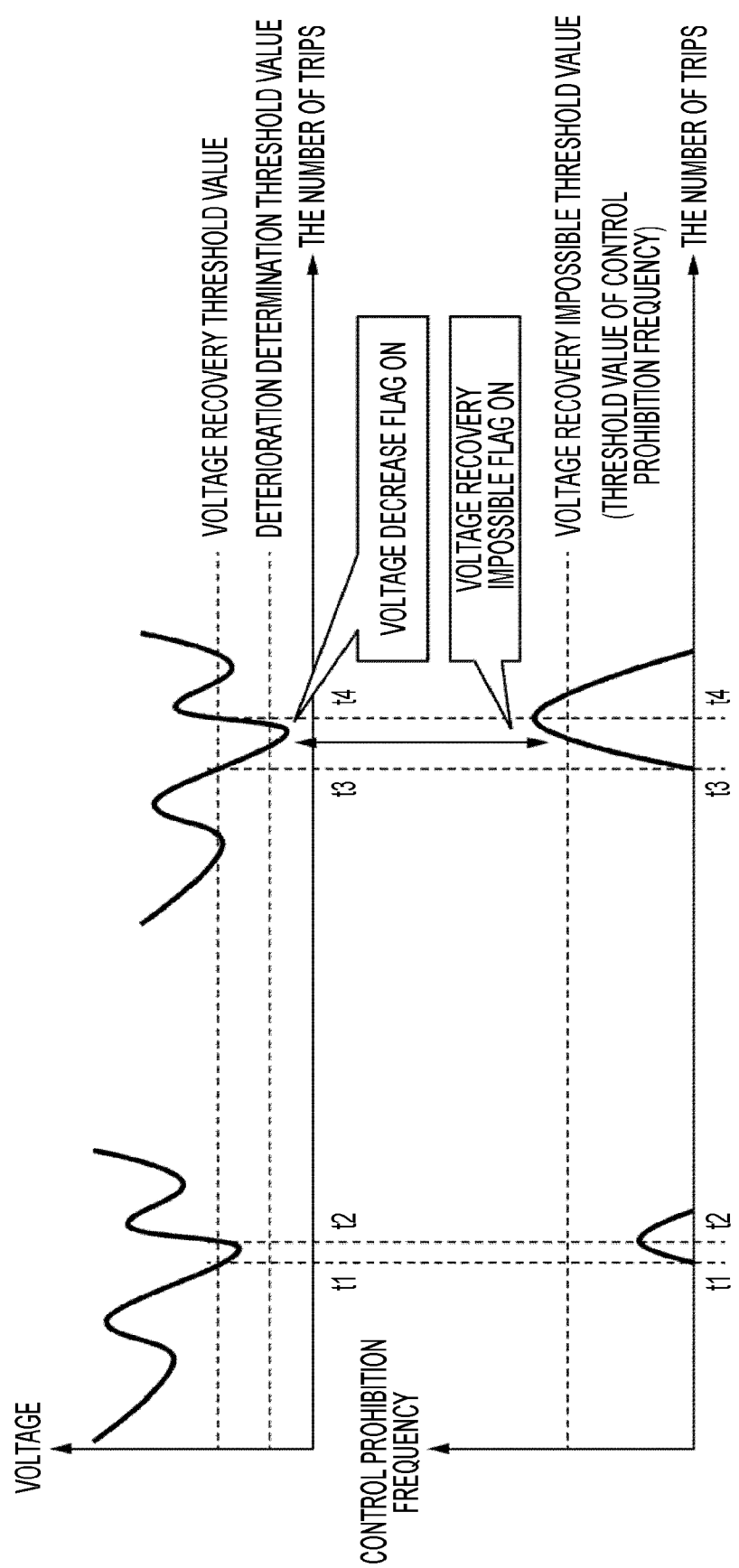
FIG. 8 is a diagram showing an example of the relationship between the number of trips of the vehicle, the voltage of the battery, and a control prohibition frequency of the vehicle.

FIG. 8 is a diagram showing an example of the relationship between the number of trips of the vehicle 10, the voltage of the battery 110, and the control prohibition frequency of the vehicle 10. Here, the control prohibition frequency of the vehicle 10 is a frequency with which the control prohibition determination has been made in the last predetermined number of times (for example, 10 times).

In the example of FIG. 8, the number of trips reaches t1, the voltage of the battery 110 falls below the voltage recovery threshold value, and the control prohibition frequency of the vehicle 10 is increased. However, in a case where the number of trips reaches t2 and the voltage of the battery 110 exceeds the voltage recovery threshold value, the control prohibition frequency of the vehicle 10 is decreased again.

Thereafter, in a case where the number of trips reaches t3, the voltage of the battery 110 falls below the voltage recovery threshold value, the control prohibition frequency of the vehicle 10 is increased, and the determination unit 220 turns on the voltage recovery impossible flag at the timing when the control prohibition frequency further exceeds the predetermined first threshold value (for example, 0.5). Thereafter, in a case where the voltage of the battery 110 further falls below the deterioration determination threshold value, the determination unit 220 turns on the voltage decrease flag. Thereafter, even in a case where the number of trips reaches t4 and the voltage of the battery 110 exceeds the voltage recovery threshold value, the determination unit 220 determines that the battery 110 is deteriorated.

In this way, since the determination unit 220 determines the deterioration in the battery 110 based on the frequency with which the voltage of the battery 110 is lower than the voltage recovery threshold value and whether or not the voltage of the battery 110 is lower than the deterioration determination threshold value, the determination can be made that the battery 110 is deteriorated, with higher accuracy than the rule-based logic without necessity of advance calibration workload.

Instead of the determination as to whether or not the voltage falls below the voltage recovery threshold value, the determination unit 220 may use information on a prohibition flag of the actual vehicle control in the vehicle 10 to calculate the control prohibition frequency. In addition, the determination unit 220 may use the information on the temperature of the battery 110 and information on a charge amount and discharge amount of the battery 110 to calculate the control prohibition frequency, in addition to the information on the voltage of the battery 110. In a case where the information on the temperature of the battery 110 is used, the determination unit 220 can avoid an erroneous determination due to the change in the voltage of the battery due to a fluctuation in the temperature of the battery 110, or consider the decrease in the voltage due to the charge and discharge by excluding an influence of the decrease in the voltage due to the decrease in the temperature. For example, the determination unit 220 may use information on the charge amount and the discharge amount in a case where the temperature of the battery 110 is within a range of a reference value. In addition, for example, in a case where the temperature of the battery 110 is not within the range of the reference value, the determination unit 220 does not have to make the determination, and may make a correction to the voltage value, the charge amount, and the discharge amount within the range of the reference value and use information on the corrected voltage value, charge amount, and discharge amount. Note that the determination unit 220 may use a table that defines a relationship between the temperature, the voltage value, the charge amount, and the discharge amount for the correction.

In addition, the determination unit 220 may use the voltage value of the battery 110 after being left for a long time, such as after the vehicle being parked for a time equal to or longer than a predetermined time. By using the voltage value of the battery 110 after being left for a long time, a determination in which an influence of the voltage change due to an internal temperature or a concentration gradient of the battery 110 is eliminated can be made.

The output unit 230 outputs the result of the determination by the determination unit 220 to the outside. The output unit 230 transmits the result of the determination by the determination unit 220 to, for example, a manufacturer of the vehicle 10, a store or a dealer that sells the vehicle 10, or a user of the vehicle 10.

Next, an action of the determination device 20 will be described.

Figure 9:
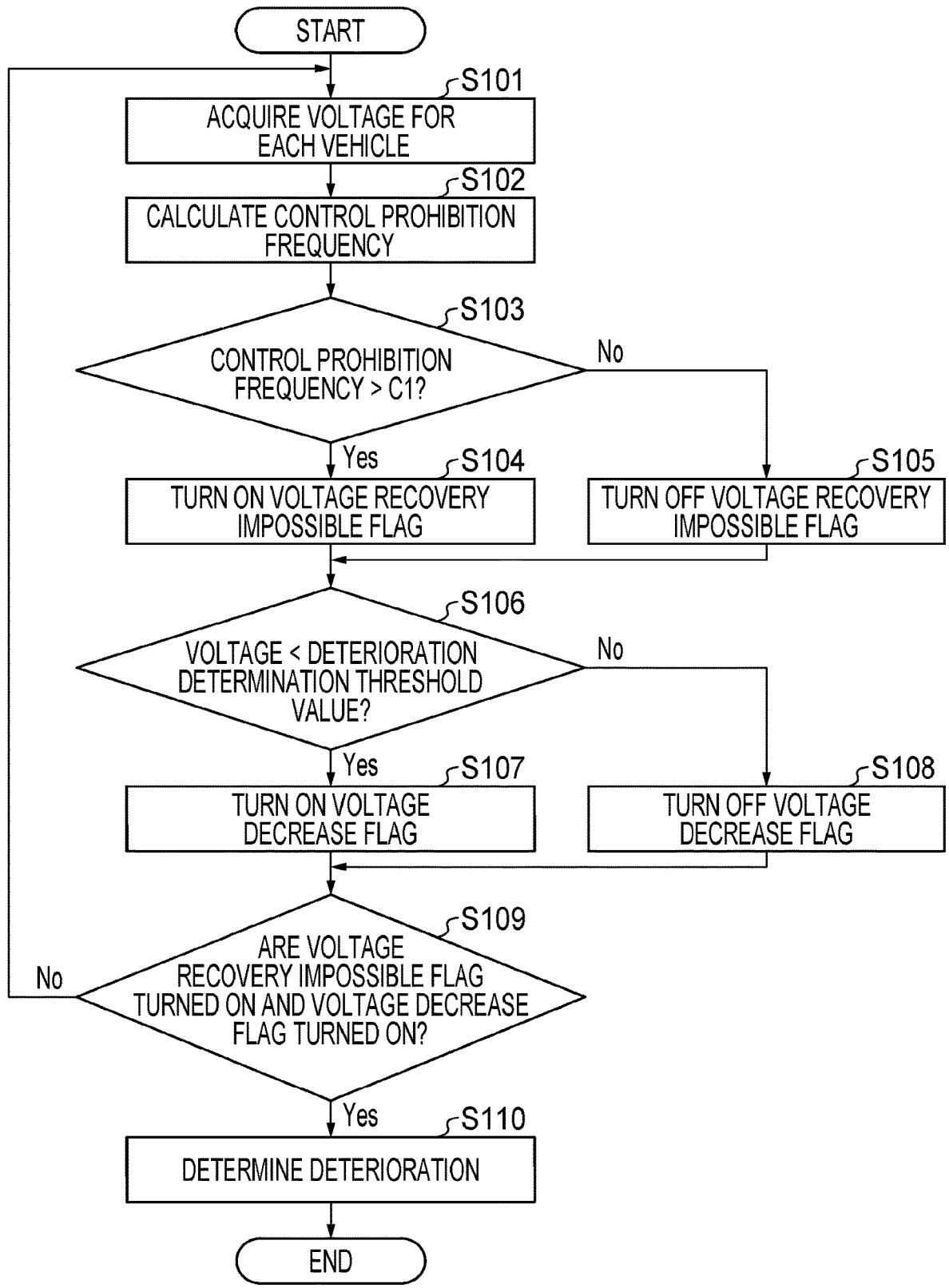
FIG. 9 is a flowchart showing a flow of determination processing by the determination device.

FIG. 9 is a flowchart showing a flow of determination processing by the determination device 20. The CPU 21 reads out the determination program from the ROM 22 or the storage 24, expands the determination program in the RAM 23, and executes the determination program, thereby executing the determination processing.

The CPU 21 acquires the voltage value of the battery 110 for each vehicle 10 in step S101.

Subsequently to step S101, the CPU 21 calculates the control prohibition frequency of the vehicle 10 in step S102. The CPU 21 calculates, for example, the frequency with which the voltage of the battery 110 in the last 10 trips is lower than the voltage recovery threshold value, as the control prohibition frequency. For example, the CPU 21 may also calculate the control prohibition frequency by executing average processing on values that are one in a case where the voltage of the battery 110 is lower than the voltage recovery threshold value and zero in other cases.

Subsequently to step S102, the CPU 21 determines whether or not the control prohibition frequency exceeds a predetermined threshold value C1 in step S103.

As a result of the determination in step S103, in a case where the control prohibition frequency exceeds the predetermined threshold value C1 (step S103; Yes), the CPU 21 turns on the voltage recovery impossible flag in step S104. On the other hand, as a result of the determination in step S103, in a case where the control prohibition frequency is equal to or lower than the predetermined threshold value C1 (step S103; No), the CPU 21 turns off the voltage recovery impossible flag in step S105.

Subsequently to step S104 or step S105, the CPU 21 determines whether or not the voltage of the battery 110 is lower than the deterioration determination threshold value in step S106.

As a result of the determination in step S106, in a case where the voltage of the battery 110 is lower than the deterioration determination threshold value (step S106; Yes), the CPU 21 turns on the voltage decrease flag in step S107. On the other hand, as a result of the determination in step S106, in a case where the voltage of the battery 110 is equal to or higher than the deterioration determination threshold value (step S107; No), the CPU 21 turns off the voltage decrease flag in step S108.

Subsequently to step S107 or step S108, the CPU 21 determines whether or not both the voltage recovery impossible flag and the voltage decrease flag are turned on in step S109.

As a result of the determination in step S109, in a case where both the voltage recovery impossible flag and the voltage decrease flag are turned on (step S109; Yes), the CPU 21 determines that the battery 110 is deteriorated in step S110. On the other hand, as a result of the determination in step S109, in a case where at least any of the voltage recovery impossible flag and the voltage decrease flag is turned off (step S109; No), the CPU 21 determines that the battery 110 is not deteriorated, and returns to the processing of step S101.

The CPU 21 executes the series of processing at a predetermined timing, such as once a day.

Through the series of processing, the CPU 21 can determine that the battery 110 is deteriorated, with higher accuracy than the rule-based logic without necessity of advance calibration workload.

Note that various processors other than the CPU may execute the determination processing executed by the CPU reading the software (program) in each embodiment described above. Examples of the processor in this case include a programmable logic device (PLD) of which a circuit configuration can be changed after manufacture, such as a field-programmable gate array (FPGA), and a dedicated electric circuit that is a processor having a circuit configuration specially designed to execute specific processing, such as an application specific integrated circuit (ASIC). In addition, the determination processing described above may be executed by one of these various processors, and may be executed by a combination of two or more processors of the same type or different types (for example, a combination of a plurality of FPGAs, and a plurality of a CPU and an FPGA). Also, more specifically, the hardware structure of these various processors is an electric circuit in which circuit elements, such as semiconductor elements, are combined.

Also, in each embodiment described above, the aspect has been described in which the determination processing program is stored (installed) in advance in the ROM or the storage, but the present disclosure is not limited to this. The program may be provided in a form recorded on a non-transitory recording medium, such as a compact disk read only memory (CD-ROM), a digital versatile disk read only memory (DVD-ROM), and a universal serial bus (USB) memory. In addition, the program may be downloaded from an external device via a network.

What is claimed is:

1. A determination device comprising a processor configured to:
    acquire information on a state of a battery mounted on a vehicle, the information including information on a voltage value of the battery;
    determine a frequency with which a prohibition flag of a start and stop control of the vehicle using the battery is set based on the acquired information;
    in a case where a temperature of the battery is outside a reference temperature range, correct a voltage value, a charge amount, and a discharge amount of the battery to the reference temperature range based on a table defining a relationship between temperature, voltage, charge amount, and discharge amount to exclude an influence of battery voltage fluctuation due to temperature change;
    turn on a first flag at a timing when the determination frequency exceeds a predetermined first threshold value;
    turn on a second flag at a timing when a corrected voltage value of the battery falls below a predetermined second threshold value; and
    in a case where both the first and second flags are turned on, transmit a notification indicating a deterioration condition of the battery to an external device located outside the vehicle.

2. The determination device according to claim 1, wherein the processor is further configured to make a deterioration determination using the corrected voltage value in a case where the battery has not been used for a time equal to or longer than a predetermined time.

3. A determination method executed by a processor, the determination method comprising:
    acquiring information on a state of a battery mounted on a vehicle, the information including information on a voltage value of the battery;
    determining a frequency with which a prohibition flag of a start and stop control of the vehicle using the battery is set based on the acquired information;
    in a case where a temperature of the battery is outside a reference temperature range, correcting a voltage value, a charge amount, and a discharge amount of the battery to the reference temperature range based on a table defining a relationship between temperature, voltage, charge amount, and discharge amount to exclude an influence of battery voltage fluctuation due to temperature change;
    turning on a first flag at a timing when the determination frequency exceeds a predetermined first threshold value;
    turning on a second flag at a timing when a corrected voltage value of the battery falls below a predetermined second threshold value; and
    in a case where both the first and second flags are turned on, transmitting a notification indicating a deterioration condition of the battery to an external device located outside the vehicle.

4. A non-transitory storage medium that stores a determination program causing a computer to execute a process comprising:
    acquiring information on a state of a battery mounted on a vehicle, the information including information on a voltage value of the battery;

determining a frequency with which a prohibition flag of a start and stop control of the vehicle using the battery is set based on the acquired information;

in a case where a temperature of the battery is outside a reference temperature range, correcting a voltage value, a charge amount, and a discharge amount of the battery to the reference temperature range based on a table defining a relationship between temperature, voltage, charge amount, and discharge amount to exclude an influence of battery voltage fluctuation due to temperature change:

turning on a first flag at a timing when the determination frequency exceeds a predetermined first threshold value;

turning on a second flag at a timing when a corrected voltage value of the battery falls below a predetermined second threshold value; and in a case where both the first and second flags are turned on, transmitting a notification indicating a deterioration condition of the battery to an external device located outside the vehicle.

\* \* \* \* \*